United States Patent Office 3,423,433
Patented Jan. 21, 1969

3,423,433
METHOD OF PRODUCING 3-KETO-4,6-BISDEHY-
DRO-6-HALOGENO-9β,10α-STEROIDS
Pieter Westerhof and Jan Hartog, Houtenlaan, Weesp,
Netherlands, assignors to North American Philips Company Inc., New York, N.Y., a corporation of Delaware
No Drawing. Filed June 24, 1965, Ser. No. 466,817
Claims priority, application Switzerland, June 26, 1964,
8,465/64; Great Britain, Jan. 22, 1965, 2,919/65
U.S. Cl. 260—397.3                    9 Claims
Int. Cl. C07c 167/16, 169/24, 169/36

ABSTRACT OF THE DISCLOSURE

Production of 3-keto-4,6-bisdehydro - 6 - halo-9β,10α-steroids by oxidation of the corresponding 3-alkoxy-3,5-bisdehydro-6-halo-9β,10α-steroid in a solvent, in the presence of manganese dioxide under neutral or weakly acidic conditions. An example is 3-ethoxy-6-chloro-17α-hydroxy-9β,10α-pregna-3,5-dien-20-one 17-acetate oxidized to 6-chloro-17α-hydroxy-9β,10α-pregna-4,6-diene-3,20 di-one 17-acetate.

It is known that 4,6-dien-3-ones of the estrane series may be prepared by manganese dioxide oxidation of 3-acyloxy or 3-alkoxy-3,5-estradienes.

The starting materials are either unsubstituted at carbon atom 6 or contain a methyl group at the said carbon atom. Further it is known to produce 3-keto-4,6-bisdehydro-steroids of the androstane and pregnane series by treating a 3-enolether-3,5-bisdehydro-steroid with a benzoquinone, such as 2,3-dichloro-5,6-dicyano-1,4-benzoquinone in the presence of an acid such as hydrochloric acid or p-toluene sulphonic acid. The starting compounds in this reaction may or may not contain a 6-chloro or 6-fluoro atom.

It is also known to oxidise certain 3-enol methyl ethers of steroids with t.butylchromate to produce the corresponding 4,6-dien-3-ones. For example, according to this procedure 17α-acetoxy-6-chloro-pregna-4,6-diene-3,20-di-one was produced from 3-enol methyl-ether of 17α-acetoxy-6-chloro-pregn-4-ene-3,20-dione (Chem Pharm. Bull. 11, page 1167 and following (1963)). All these known reactions were carried out with steroids having the normal configuration at the carbon atoms 8, 9, 10, 13 and 14.

It has now been found that 3-alkoxy-3,5-bisdehydro-6-fluoro (or 6-chloro- or 6-bromo-)-9β,10α-steroids may conveniently be converted into 3-keto-4,6-bisdehydro-6-fluoro (or 6-chloro- or 6-bromo-)-9β,10α-steroids by oxidation with manganese dioxide.

The 9β,10α-steroids to be used as starting materials deviate in their stereochemical configuration of the steroid nucleus from the normal steroids. While the latter compounds have a 8β,9α,10β,13β,14α-configuration our starting materials have the configuration 8β,9β,10α,13β,14α. While the deviation in stereochemical configuration relates to the carbon atoms 9 and 10 only our starting materials are described by mentioning the deviating structures at these latter two carbon atoms only: namely 9β,10α.

Any 3-alkoxy group comprises aliphatic or mixed aliphatic-aromatic alkoxy groups containing 1–10 carbon atoms. As such may be mentioned methoxy-, ethoxy-, propoxy-, tert.butoxy-, cyclopentyloxy-, cyclohexyloxy- and benzyloxy groups. However a 3-alkoxy group is preferably an aliphatic alkoxy group containing 1–6 carbon atoms.

Any etherified hydroxy group at carbon atom 17 comprises also aliphatic or mixed aliphatic-aromatic alkoxy groups containing from 1–10 carbon atoms. Besides the herebefore given specific examples also the following ones may be mentioned: cyclopent-1'-enyloxy-, 1'-ethoxy-cyclopentyloxy and tetrahydropyranyloxy.

Any esterified hydroxy group at carbon atom 17 comprises the acyl group of an inorganic acid of an aliphatic mono-, di- or tricarboxylic acid containing from 1–20 carbon atoms or the acyl group of a mixed aliphatic-aromatic carboxylic acid. Examples of these OR groups are formoxy-, acetoxy-, propionoxy-, butyroxy-, the acyloxy groups of oleic acid, palmitic acid, stearic acid, enanthoic acid, undecyloic acid, caproic acid, pivelic acid, succinic acid, malonic acid, citric acid, benzoic acid and p-hexyl-oxy-phenyl propionic acid, sulphuric acid or phosphoric acid.

It should be observed that methods of producing 3-alkoxy-3,5-bisdehydro-6-fluoro-9β,10α-steroids and the corresponding 6-chloro and 6-bromo compounds have been disclosed in our prior filed and copending applications Ser. No. 387,758, filed Aug. 5, 1964 and Ser. No. 399,374, filed Sept. 25, 1964 and both now abandoned in which applications further pharmacological properties of 3-keto-4,6-bisdehydro-6-fluoro-9β,10α-steroids and the corresponding 6-chloro and 6-bromo compounds are indicated.

The oxidation according to the invention has to be carried out under avoidance of hydrolysing conditions of the 3-enol-ether function. Thus the presence of strongly acting acids is to be excluded. Preferably the reaction is carried out under neutral or weakly acidic conditions, for example in a medium comprising an aqueous solution of lower aliphatic carboxylic acids, such as acetic acid.

Suitable solvents for the starting material are aromatic or aliphatic hydrocarbons such as benzene, toluene, xylene, further cyclic ethers such as dioxan, tetrahydrofuran, whether or not in the presence of water. Other suitable solvents are aqueous solutions of aliphatic carboxylic acid containing from 1–6 carbon atoms, such as acetic acid, propionic acid or butyric acid. The time of reaction may vary from 5 minutes to 24 hours dependent on the reaction temperature, the type of substituent at carbon atom 6, and the state of activity of the oxidising agent. In this latter respect it may be observed that a suitable method of preparing manganese dioxide has been described in British patent specification 871,487.

The reaction temperature may vary from 0–100° C. but is preferably kept at about 5–30° C.

The starting material to be used in the process of the invention may contain other substituents than already indicated. In particular those starting materials may be used which besides a 3-alkoxy-3,5-bisdehydro-6-halogeno grouping contain at carbon atom 17 an acetyl group and a hydrogen atom, or an acetyl group and a hydroxy-, esterified or etherified hydroxy group or at carbon atom 17 a hydrogen atom and a hydroxy, esterified or etherified hydroxy group. Preferably the method according to the invention is applied to compounds of the general formula

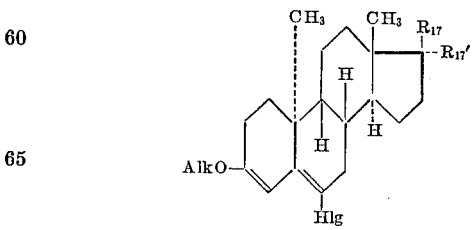

in which formula OAlk represents an alkoxy group containing from 1–6 carbon atoms, Hlg is a fluoro-, chloro- or bromo atom and $R_{17}$ and $R_{17}'$ represent in combination a β-orientated acetyl group and a hydrogen atom or a β-orinentated acetyl group and a hydroxy, esterified or etherified hydroxy group or a β-orientated hydroxy, esterified or etherified hydroxy group and a hydrogen atom.

EXAMPLE I

9β,10α-pregn-4-ene-3,20-dione was reacted with p-toluene-sulphonic acid in waterfree benzene followed by addition of isopropenylacetate and gentle heating. The reaction mixture was worked up to produce 9β,10α-pregna-3,5-dien-3-ol-20-one 3-acetate (I.R. spectrum shows maxima at 1750, 1698, 1654, 1640, 1617, 1356, 1198, 1012, 919 and 879 cm.$^{-1}$), $a$ (1 cm., 1%) λ max.=236 nm.=530 (in methanol), ε (236 nm.)=18.900.

1.85 g. of the latter compound were dissolved in 30 ml. of diethylether and a solution of 4 g. of potassium acetate in 60 ml. of 85% acetic acid was added. Then at 0° C., while stirring, a solution of 8.25 mg. of bromine in 15 ml. of acetic acid was added in drops. After stirring for some time 6β-bromo-9β,10α-pregn-4-ene-3,20-dione was obtained which was recrystallised from ethyl acetate.

A solution of 1.18 g. of 6β-bromo-9β,10α-pregn-4-ene-3,20-dione and 50 mg. of p-toluene sulphonic acid in a mixture of 5 ml. of methylene chloride, 20 ml. of purified,[1] dry dioxan and 1.2 ml. of freshly distilled ethyl orthoformate was allowed to stand at room temperature for 20 hours. According to the thin-layer chromatogram no more starting material proved to be present in the crude reaction mixture. After dilution with 300 ml. of petroleum ether and the addition of 1 ml. of dry pyridine, the reaction mixture was filtered through a column of 20 g. of silicagel. Elution was completed with 200 ml. of a mixture of benzene and petroleum ether (1+3). Repeatment of the filtration procedure through another 20 g. of silicagel gave 0.8 g. of oily 3-ethoxy-6-bromo-9β,10α-pregna-3,5-dien-20-one after evaporation of the solvents in vacuo. The 3-enol-ether was dissolved into 8 ml. of acetic acid and the solution added to a suspension of 3.5 g. of magnesium dioxide in 35 ml. of acetic acid and 3.5 ml. of water. After stirring for one hour the reaction mixture was worked up by filtration and evaporation of the main part of the acetic acid mixture in vacuo. The residue was taken up in a mixture of benzene and ether and the extract was washed until free of acetic acid with a sodium bicarbonate solution and water. Drying, filtration and evaporation of the solvents finally yielded 0.77 g. of a resin with a (1%, 1 cm.)=342 at 292 nm. Chromatography through a column of 15 g. of silicagel and elution with mixtures of benzene and acetone containing increasing quantities of the latter solvent yielded 0.37 g. of an appropriate fraction. Recrystallization from ethanol yielded 230 mg. of 6-bromo-9β,10α-pregna-4,6-diene-3,20-dione with a melting point of 105–107° (dec.) (vacuo). Physical constants of an analytically pure preparation: Melting point: 107–108° (dec.) (vacuo). ε (λ maximum=292 nm.)=19.000. $[\alpha]_D^{25}$=−321°. Found: C 64.0, 64.2; H 7.0, 7.0; Br 20.9, 20.8. Calc. for $C_{21}H_{27}O_2Br$ (391.36): C 64.45; H 6.95; Br 20.42. Infra-red absorption bands at 1703, 1655, 1605, 1580, 1360, 1275, 1238, 1201, 1125, 892 and 794 cm.$^{-1}$.

EXAMPLE II 3,17α - dihydroxy-9β,10α-pregna-3,5-dien-20-one 3,17-diacetate (Rec. Trav. Chim. 79, 1118 (1960)) was chlorinated with chlorine dissolved in a mixture of ether, water and acetic acid in the presence of potassium acetate. This reaction resulted from 6β-chloro-17α-hydroxy-9β,10α - pregn-4-ene-3,20-dione 17-acetate, which compound was isolated in the usual manner.

[1] The dioxan was purified according to: L. F. Fieser, Exp. Org. Chem. 19, 369.

To a solution of 4.82 g. of 6β-chloro-17α-hydroxy-9β,10α-pregn-4-ene-3,20-dione 17-acetate in 90 ml. of dry, purified dioxan were added 4.2 ml. of ethylorthoformate and 160 mg. or p-toluenesulphonic acid. The mixture was kept in the dark at room temperature for 20 hours. Then 1 l. of petroleum ether and 1 ml. of dry pyridine were added to the reaction mixture, after which the milky solution was filtered through a column of 48 g. of silicagel. The first fraction (1.1) contained 4.25 g. of etherified product. Elution with 0.5 l. of petroleum ether-benzene (1+1) afforded a second fraction of 0.44 g. The combined residues were recrystallised at 0° C. from ethanol containing 1% of pyridine, yielding 3.72 g. of 3-ethoxy-6-chloro - 17α-hydroxy-9β,10α-pregna-3,5-dien-20-one 17-acetate with a melting point of 133.5–135° and an $a$ (1%, 1 cm.)=453 at 253 nm. Physical constants of the analytically pure substance. Melting point: 134.5–135.5°

$$[\alpha]_D^{25} = +52°$$

ε (λ maximum=253 nm.)=19.600. Found: C 69.3; H 8.2; Cl 8.3. Calc. for $C_{25}H_{35}O_4Cl$ (435.02): C 69.02; H 8.11; Cl 8.15. Infrared absorption bands at: 1741, 1712, 1648, 1619, 1381, 1353, 1248, 1238, 1227 and 1194 cm.$^{-1}$.

To a suspension of 17.5 g. of manganese dioxide in 210 ml. of acetic acid and 17.5 ml. of water was added 3.5 g. of 3 - ethoxy - 6 - chloro-17α-hydroxy-9β,10α-pregna-3,5-dien-20-one 17-acetate. After stirring at room temperature for 3 hours the manganese dioxide was sucked off and the solid material obtained was thoroughly washed with in total 150 ml. of acetic acid. Concentration in vacuo was followed by pouring into water and extraction with a mixture of benzene and ether. The resinous residue showed an $a$ (1%, 1 cm.)=394 at 285 nm.

A solution of this residue in benzene was chromatographed through a column of 70 g. of silicagel. Elution was performed with mixtures of benzene and acetone containing increasing quantities of the latter solvent. Combination of the appropriate fractions gave 2.4 g. of a resin, which was crystallized from ethanol at room temperature. The crystals of 6-chloro-17α-hydroxy-9β,10α-pregna-4,6-diene-3,20-dione 17-acetate (1.77 g.) melted at 145 (sintering)–150.5–151° (dec.) and showed an $a$ (1%, 1 cm.)=524 at 285 nm. Physical constants of the pure compound: Melting point: 150–151° (dec.). ε (λ maximum=286 nm.)=20.800. $[\alpha]_D^{25}$=−401°. Found: C 67.5, 67.5; H 7.2, 7.1; Cl 9.5, 9.6. Calc. for $C_{23}H_{29}O_4Cl$ (404.94): C 68.21; H 7.22; Cl 8.75. Infrared absorption bands at: 1742, 1718, 1665, 1620, 1590, 1370, 1355, 1252, 1240, 1060, 1028 and 896 cm.$^{-1}$.

EXAMPLE III

17β-hydroxy-9β,10α-androst-4-en-3-one was added to isopropenylacetate containing a few drops of concentrated sulphuric acid. Thus produced 9β,10α-androsta-3,5-diene-3,17-diol-3,17-diacetate was isolated in the normal manner and crystallised from methanol. The crystalline product was dissolved in diethylether to which solution was added a solution of waterfree sodium acetate in 85%-ic aqueous acetic acid at a temperature of −10° C. This solution was chlorinated by addition of a solution of chlorine gas in acetic acid. Thus a mixture of 6α- and 6β-chloro - 17β-hydroxy-9β,10α-androst-4-en-3-one 17-acetate is produced. By chromatography and fractionated crystallization the 6β-chloro isomer can be isolated.

To a solution of 3 g. of 6β-chloro-17β-hydroxy-9β,10α-androst-4-en-3-one 17-acetate in 60 ml. of dry, freshly distilled dioxan were added 3 ml. of freshly distilled ethylorthoformate and 120 mg. of p-toluenesulphonic acid. The solution was allowed to stand at room temperature in the dark for 20 hours. After the addition of a mixture of 1.5 l. of petroleum ether and 1 ml. of dry pyridine the reaction mixture was chromatographed through a column of 60 g. of silicagel. Elution was performed with in total 1 l. of benzene-petroleum ether (1+3). The fractions containing the 3-enolether (thin-layer chromatography) were combined and the solvents were evaporated in vacuo. As some ethylorthoformate proved to be present in the residue the filtration through silicagel was repeated By this procedure 2.98 g. of nearly pure 3 - ethoxy-6-chloro-9β,10α-androsta - 3,5-dien-17β-ol 17-acetate were obtained, which could not be caused to crystallize.

The 3-enolether (2.85 g.) was dissolved in 25 ml. of acetic acid and the solution was added to a well-stirred suspension of 12.5 g. of manganese dioxide in a mixture of 125 ml. of acetic acid and 12.5 ml. of water. Thin-layer chromatography indicated that the reaction was nearly complete in about 5 minutes. After stirring for 45 minutes work-up was performed by filtration of the manganese dioxide, and concentration of the filtrate in vacuo at ~60°. The residue was poured into water and the mixture extracted with benzene-ether. The residue (2.8 g.) showed an $a$ (1%, 1 cm.) (286 nm.)=523. A solution of it in benzene was filtered through a column of 30 g. of silicagel, after which elution was carried out with mixtures of benzene-acetone. The residue (2.25 g.) obtained after evaporation of the solvent was recrystallised from ethanol at 0° to yield 1.79 g. of 6-chloro-17β-hydroxy-9β,10α-androsta-4,6-dien-3-one 17-acetate with a melting point of 146.5–152–153° (dec.) (vacuo) and $a$ (1%, 1 cm.) (286 nm.)=574. Two recrystallizations of a sample from the same solvent gave an analytical preparation. Melting point: 158.5–159–5 (dec.) (vacuo). $\epsilon$ λ maximum=286 nm.)=21.400. $[\alpha]_D^{25}$=−431.5°. Found: C, 68.6, 68.8; H, 7.5, 7.7; Cl, 10.0, 10.0. Calc. for $C_{21}H_{27}O_3Cl$(362.90): C, 69.50; H, 7.50; Cl, 9.77. Infrared bands at: 1740, 1670, 1620, 1590, 1420, 1250, 1048, 1032 and 890 cm.$^{-1}$.

EXAMPLE IV 3-hydroxy-9β,10α-pregna-3,5-dien-20-one 3-acetate was obtained by enolacetylation with isopropenylacetate in benzene in the presence of p-toluene sulphonic acid of 9β,10α-pregn-4-ene-3,20-dione. The enolacetate was reached with perchlorylfluoride in acetone ethanol in the presence of potassium acetate to produce a mixture of 6α- and 6β-fluoro-9β,10α-pregn-4-ene-3,20-dione. This mixture was separated into the 6α- and 6β-isomers by chromatography and fractionated crystallization.

A solution of 1 g. of 6α-fluoro-9β,10α-pregn-4-ene-3,20-dione and 40 mg. of p-toluene sulphonic acid in 20 ml. of dry, purified dioxan and 1 ml. of freshly distilled ethylorthoformate was kept in the dark for 20 hours. Work-up and chromatography gave 0.95 g. of a noncrystallizing resin substantially being the 3-ethoxy-6-fluoro-9β,10α-pregna-3,5-dien-20-one.

A solution of this enolether in 15 ml. of acetic acid was added to a suspension of 5 g. of manganese dioxide in 35 ml. of acetic acid and 4.5 ml. of water, after which the mixture was stirred for 45 minutes. Work-up and chromatography gave 0.57 g. of a residue, which was recrystallised from ethanol at 0°. Suction gave 0.33 g. of 6-fluoro-9β,10α-pregna-4,6-diene-3,20-dione with a melting point of 174($s$)–177–178.5° and an $a$ (1%, 1 cm.)=690 at 285 nm.

The 3,17β-diacetoxy-17α lower alkyl (or alkinyl)-9β,10α-androsta-3,5-dienes mentioned in the examples following here below may be prepared by reacting 17β-hydroxy-17 lower alkyl (or alkinyl)-9β,10α-androst-4-en-3-ones with excess of acetic anhydride in the presence of p-toluenesulphonic acid.

EXAMPLE V

A mixture of 4.4 g. of 6β-chloro-17α-methyl-17β-acetoxy-9β,10α-androst-4-en-3-one, prepared by chlorination with chlorine of 3,17β-diacetoxy-17α-methyl-9β,10α-androsta-3,5-diene in a medium of potassium acetate, acetic acid, 240 mg. p-toluenesulphonic acid, 3.6 g. of orthoformic acid ethyl ester and 60 ml. of dioxan was left to stand for 7 hours in the dark at room temperature. This solution was added dropwise within 5 minutes to a well-stirred mixture of 240 ml. of glacial acetic, 18 ml. of water and 21.6 g. of manganese dioxide. It was stirred for 60 minutes at 25°, thereafter filtered off from the manganese dioxide and washed out well with glacial acetic and methylene chloride. The filtrate was poured into ice-water and extracted with methylene chloride/petroleum ether (1:1). The organic extract was washed with sodium carbonate solution and water, dried with sodium sulphate and evaporated. The residue (4.6 g.), dissolved in benzene, was filtered through 50 g. of aluminium oxide. The substance obtained from the eluate was recrystallized from acetone/hexane and yielded 2.5 g. of pure 6-chloro-17α-methyl-17β-acetoxy-9β,10α-androsta-4,6-dien-3one of melting point 153–154°. UV: $\lambda_{max}$.286 mμ, $\epsilon$=21800;

$[\alpha]_{589b}^{25°}$=−388°(c.=0.1 in dioxan)

IR-bands at 5.83; 6.05; 6.22; 6.35; 6.92; 7.36; 7.98μ.

The compound is anabolically/androgenically active; acts uterotrophically and inhibits the action of exogenic estradiol; shows oestrogen-like action in intact, but not in castrated animals and acts as a strong gestagen orally and parenterally.

EXAMPLE VI

A solution of 846 mg. of 6β-bromo-17α-methyl-17β-acetoxy-9β,10α-androst-4-en-3-one, prepared by bromination with bromine of 3,17β-diacetoxy-17α-methyl-9β,10α-androsta-3,5-diene in a medium of potassium acetate and acetic acid, 30 mg. of p-toluenesulphonic acid and 0.6 g. of orthoformic acid ethyl ester in 15 ml. of dioxan was allowed to stand in the dark for 7 hours at room temperature. This solution was added, while stirring, to a mixture of 4.15 g. of manganese dioxide, 45 ml. of glacial acetic and 3.5 ml. of water. It was stirred for 35 minutes and thereafter filtered. The filtrate was poured into ice-water and extracted with methylene chloride/petroleum ether. The crude product obtained from the extract was chromatographed on silicagel with elution with benzene/acetone (98:2) and yielded 6-bromo-17α-methyl-17β-acetoxy-9β,10α-androsta-4,6-dien-3-one, melting point 102° (under decomposition) after crystallization from acetone/hexane. UV: $\lambda_{max}$. 289 mμ, $\epsilon$=19800;

$[\alpha]_{589}^{25°}$=−361° (c.=0.1 in dioxan)

IR-bands at 5.81; 6.04; 6.25; 6.34; 7.36; 8.02μ.

The compound is anabolically/androgenically active; acts uterotrophically and inhibits the action of exogenic estradiol.

EXAMPLE VII

A solution of 1.8 g. of 6β-chloro-17α-ethyl-17β-acetoxy-9β,10α-androst-4-en-3-one, prepared by chlorination with chlorine of 3,17β-diacetoxy-17α-ethyl-9β,10α-androsta-3,5-diene in a medium of potassium acetate and acetic acid, 100 mg. of p-toluenesulphonic acid and 1.5 g. of orthoformic acid ethyl ester in 25 ml. of dioxan was allowed to stand for 6 hours at 25°, thereafter the solution was added in 5 minutes to a mixture of 9.0 g. of manganese dioxide, 100 ml. of acetic acid and 7.4 ml. of water. After stirring for 30 minutes the precipitate was filtered off and the filtrate poured into ice-water. It was extracted with methylene chloride/petroleum ether, washed neutral with water and dried over sodium sulphate. After chromatography on aluminum oxide there was obtained 6 - chloro - 17α - ethyl-17β-acetoxy-9β,10α-androsta-4,6-dien-3-one as a yellowish oil, which did not crystallize. UV: $\lambda_{max}$. 285 mμ, $\epsilon$=18000;

$[\alpha]_{589}^{25°}$=−338°

IR-bands at 1736, 1675, 1621, 1592, 1247 cm.$^{-1}$.

EXAMPLE VIII

A solution of 5 g. of 6β-chloro-17α-ethinyl-17β-acetoxy-9β,10α-androst-4-en-3-one, prepared by chlorination with chlorine of 3,17β-diacetoxy-17α-ethinyl-9β,10α-androsta-3,5-diene in a medium of potassium acetate, acetic acid and methylene chloride, 4.5 ml. of ethyl orthoformate and 0.25 mg. of p-toluenesulphonic acid in 70 ml. of dioxan was allowed to stand in the dark for 5½ hours. This solution was added dropwise to a suspension of 24.5 g. of manganese dioxide in 220 ml. of glacial acetic and 18 ml. of water within 10 minutes.

There were obtained 5.1 g. of a crude product which, after recrystallization from methylene chloride/isopropyl ether, yielded 3.2 g. of pure 6-chloro-17α-ethinyl-17β-acetoxy-9β,10α-androsta-4,6-dien-3-one of melting point 244–245°. UV: $\lambda_{max.}$ 283 mμ, ε=21900;

$$[\alpha]_{589}^{25°} = -440°$$

IR-bands at 3104, 3232, 2301, 1741, 1670, 1657, 1614, 1580 and 1247 cm.$^{-1}$.

The compound is progestationally active.

We claim:

1. A method of producing a 3-keto-4,6-bisdehydro-6-halo-9β,10α-steroid of the androstane and pregnane series comprising oxidizing with manganese dioxide a solution of the corresponding 3 - alkoxy-3,5-bisdehydro-6-halo-9β,10α-steroid under neutral or weakly acidic reaction conditions, said halo moiety being selected from the group consisting of fluorine, chlorine and bromine atoms.

2. The method of claim 1 wherein a 9β,10α-steroid of the formula

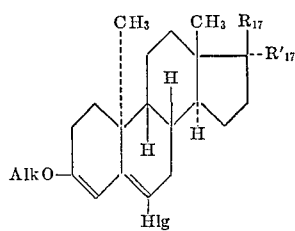

wherein AlkO is alkoxy of 1–6 carbon atoms inclusive, Hlg is a halogen atom selected from the group consisting of fluorine, chlorine and bromine, $R_{17}$ is a β-oriented moiety selected from the group consisting of acetyl, hydroxy, alkoxy and acyloxy and $R_{17}'$ is an α-oriented moiety selected from the group consisting of hydrogen, hydroxy, alkoxy and acyloxy with the proviso that $R_{17}'$ is only hydrogen when $R_{17}$ is other than acetyl, is converted to a compound of the formula

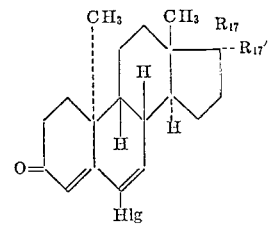

wherein Hlg, $R_{17}$ and $R_{17}'$ have their above-mentioned meanings.

3. The method of claim 2 wherein the oxidation is carried out under aqueous conditions in the presence of an aliphatic carboxylic acid containing from 1–6 carbon atoms.

4. The method of claim 3 wherein the oxidation is carried out in the presence of acetic acid.

5. The method of claim 2 wherein the reaction is carried out in an aqueous solution of a cyclic ether.

6. The method of claim 2 wherein 3-ethoxy-6-chloro-17α-hydroxy-9β,10α-pregna-3,5-dien-20-one 17-acetate is oxidized to produce 6-chloro-17α-hydroxy-9β,10α-pregna-4,6-diene-3,20-dione 17-acetate.

7. The method of claim 2 wherein 3-ethoxy-6-bromo-9β,10α-pregna-3,5-dien-20-one is oxidized to produce 6-bromo-9β,10α-pregna-4,6-diene-3,20-dione.

8. The method of claim 2 wherein 3-ethoxy-6-fluoro-9β,10α-pregna-3,5-dien-20-one is oxidized to produce 6-fluoro-9β,10α-pregna-4,6-diene-3,20-dione.

9. The method of claim 2 wherein 3-ethoxy-6-chloro-9β,10α-androsta-3,5-dien-17β-ol 17-acetate is oxidized to produce 6-chloro-17β-hydroxy-9β,10α-androsta-4,6-dien-3-one 17-acetate.

References Cited

UNITED STATES PATENTS 3,258,473   6/1966   Kincl _____ 260—397.4
3,304,314   2/1967   Reerink et al. _____ 260—397.5

LEWIS GOTTS, *Primary Examiner.*

JOHNNIE R. BROWN, *Assistant Examiner.*

U.S. Cl. X.R.

167—74; 260—397.4, 397.5